Feb. 23, 1965 R. L. BROWN 3,171,071

SEAM FOLLOWER

Filed July 15, 1960 2 Sheets-Sheet 1

Robert L. Brown,
*INVENTOR.*

BY S. J. Rotondi
A. T. Dupont
C. A. Phillips

ATTORNEYS.

SEAM FOLLOWER

Filed July 15, 1960 2 Sheets-Sheet 2

Robert L. Brown,
*INVENTOR.*

BY S. J. Rotondi
A. T. Dupont
C. A. Phillips

ATTORNEYS.

United States Patent Office 3,171,071
Patented Feb. 23, 1965

3,171,071

SEAM FOLLOWER

Robert L. Brown, 2019 Princeton Blvd., Huntsville, Ala.

Filed July 15, 1960, Ser. No. 43,253
8 Claims. (Cl. 318—31)
(Granted under Title 35, U.S. Code (1952), sec. 266)

The invention described herein may be manufactured and used by or for the Government for governmental purposes without the payment of any royalty thereon.

This invention relates generally to proximity detectors, and more particularly to seam following devices for automatic welding machines.

In general, known welding seam guides provide insufficient sensitivity for many applications, and, as an example, will not usually follow a seam which is fitted very tightly. This presents a serious disadvantage when attempting to use automatic guidance to make accurate butt joints.

Therefore, it is a purpose of this invention to reveal a welding guide seam follower which is extremely sensitive, and which can accurately trace a tightly fit or irregular seam.

This invention operates by means of a novel proximity detector which senses changes in permeability of the surrounding media, and controls a servo system, which in turn moves both a welding head and the detector, thus positioning it over the seam. As will be more fully described, the device is so sensitive that it will easily follow the finest seam or, indeed, even a sufficiently deep scratch. This and other features of the present invention will be made more clear by the following specification considered in conjunction with the drawings in which.

Figure 1:
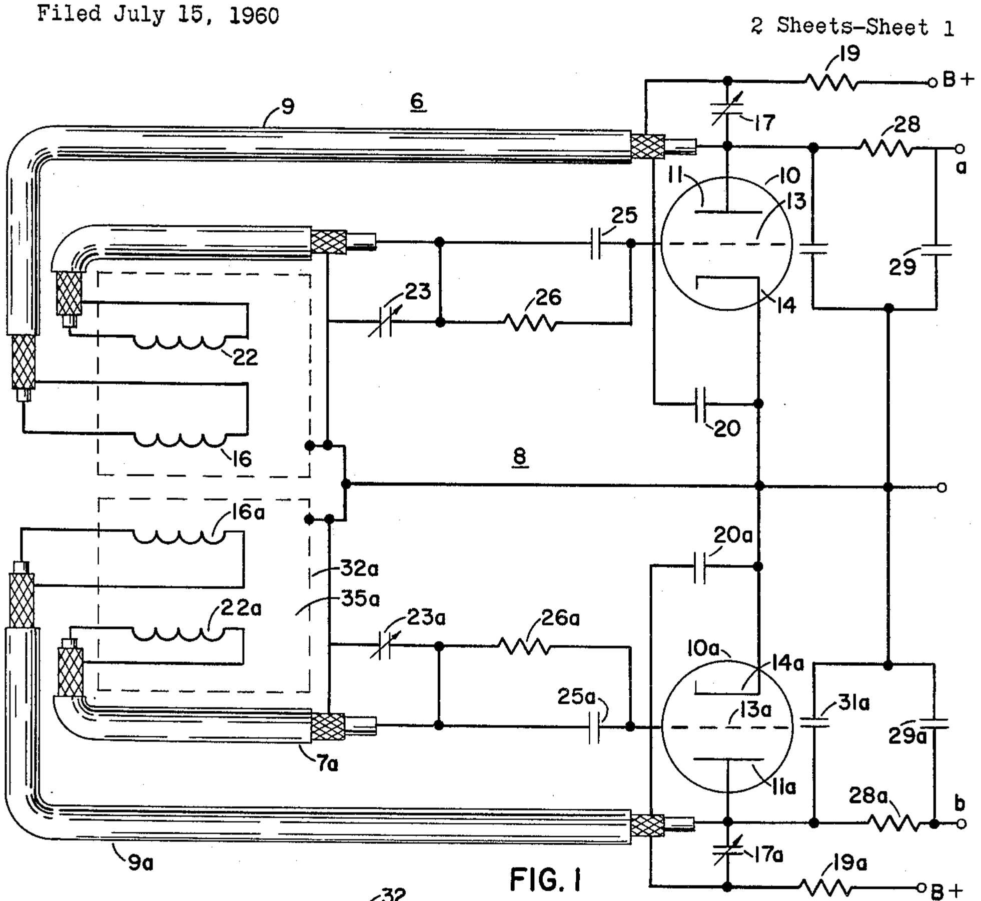
FIGURE 1 is a schematic diagram of an embodiment of a seam detector constructed in accordance with the invention.

Referring now to FIGURE 1 there is shown a dual oscillator system consisting of identical oscillators 6 and 8. Components in oscillator 8 which correspond to components in oscillator 6 bear the same number with the suffix *a* added. FIGURE 1 will be described with respect to oscillator 6, it being understood that the operation of oscillator 8 is identical. Coil 22 and capacitor 23 which are parallel connected through coaxial cable 7 comprise an input resonant circuit, which is connected between the grid 13 and cathode 14 of triode 10 through capacitor 25, paralleled by grid leak resistor 26. An output resonant circuit, comprising coil 16 and capacitor 17 parallel connected through coaxial cable 9 is connected through cathode return capacitor 20 between plate 11 and cathode 14 of triode 10. Coils 16 and 22 are positioned and phased within shield 32 of probe assembly 35 to provide coupling for feedback to thus provoke oscillation. The plate or output resonant circuits of oscillators 6 and 8 are tuned to a frequency near to that of the grid input circuits. The oscillations which occur, produce D.C. voltage drops across plate load resistors 19 and **19*a*. Stronger or weaker oscillation of the circuits occasioned by a change in permeability of the surrounding media, and therefore of coils 16 and 16*a* (and thus a variation in feedback) will be reflected by greater or lesser current drain, thus a greater or lesser D.C. voltage across resistors 19 and 19*a*. These voltages are filtered by a filter composed of resistance 28 and 28*a* and capacitances 29, 29*a*, 31 and 31*a*, which removes the oscillatory signal from the D.C. output. The difference between these voltages, representing the difference in permeability sensed by coils 16 and 16*a*, appears between the output terminals 33 and 33*a* across which the outputs of oscillators 6 and 8** are fed in series opposition.

Figure 2:
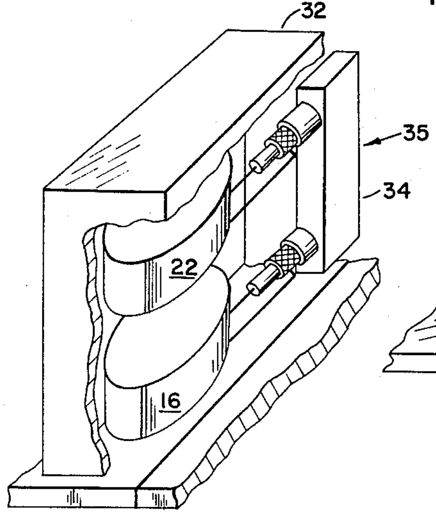
FIGURE 2 is a perspective view of detector coil assemblies.

FIGURE 2 shows the component arrangement of probe assembly 35 consisting of coils 16 and 22 positioned in housing shield 32 by spacer block 34. The shield 32, as shown, is open at one end and may be filled with a dielectric potting compound to preserve the physical relation between coils which is essential to prevent a drift of circuit constants. As illustrated, the sensing coil 16, which is in the plate resonant circuit, is adjacent the open end and the seam to be followed, and coil 22, which is in the grid resonant circuit, is substantially spaced from the seam. With this configuration the effect of the seam position is to effect the tuning of the plate circuit to bring it closer or farther from the frequency of oscillation which is largely determined by the grid circuit. As noted above, this in turn varies the feedback and thus the intensity of oscillation of oscillator 6 (or 8).

Figure 3:
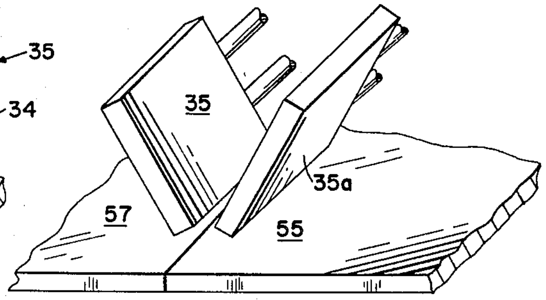
FIGURE 3 shows a preferred way of positioning the coils shown in FIGURE 2.

FIGURE 3 illustrates the orientation of probe assemblies 35 and **35*a* with respect to the joint or seam between the materials 55 and 57, which seam is to be followed and welded. The probe assemblies form a V with the seam at the vertex, except that a small gap is maintained between the probe assemblies and the seam. To consider the operation of the detector, assume that probes 35 and 35*a* are positioned symmetrically above the seam and thus the resonant circuit formed by coil 16 and capacitor 17 and the one formed by coil 16*a* and capacitor 17*a* are tuned to like frequencies. In this posture, oscillators 6 and 8** will oscillate with equal intensities, the voltages at the output terminals will be equal, and, it follows, the voltage between the output terminals zero. Thus a zero error in positioning of the probe corresponds to a zero signal output.

Assume next that the probe assemblies 35 and **35*a* (FIGURE 3) deviate to the right of the seam and thus probe assembly 35, being now closer to the joint is effected by a less permeable proximity (assuming the materials are paramagnetic; there would be an increase if they are diamagnetic) causing the frequency of the plate resonant circuit formed by coil 16 and capacitor 17 to increase. Assume further that this causes the plate circuit to tune closer to the frequency of its associated grid resonant circuit and thus the intensity of oscillation of oscillator 6 increases. Conversely with a deviation away from the joint by probe assembly 35*a* the intensity of oscillation of oscillator 8 decreases. The result will be that the output plate voltage drop of oscillators 6 and 8 will be different, 8 being greater than 6**. If the lower output terminal were used as a reference (instead of the indicated reference), the output at the upper output terminal would be negative and equal in magnitude the difference between the two output voltages. As will be discussed below the output signal may be used to reposition the probe assemblies to eliminate the deviation or error in probe position.

Figure 4:
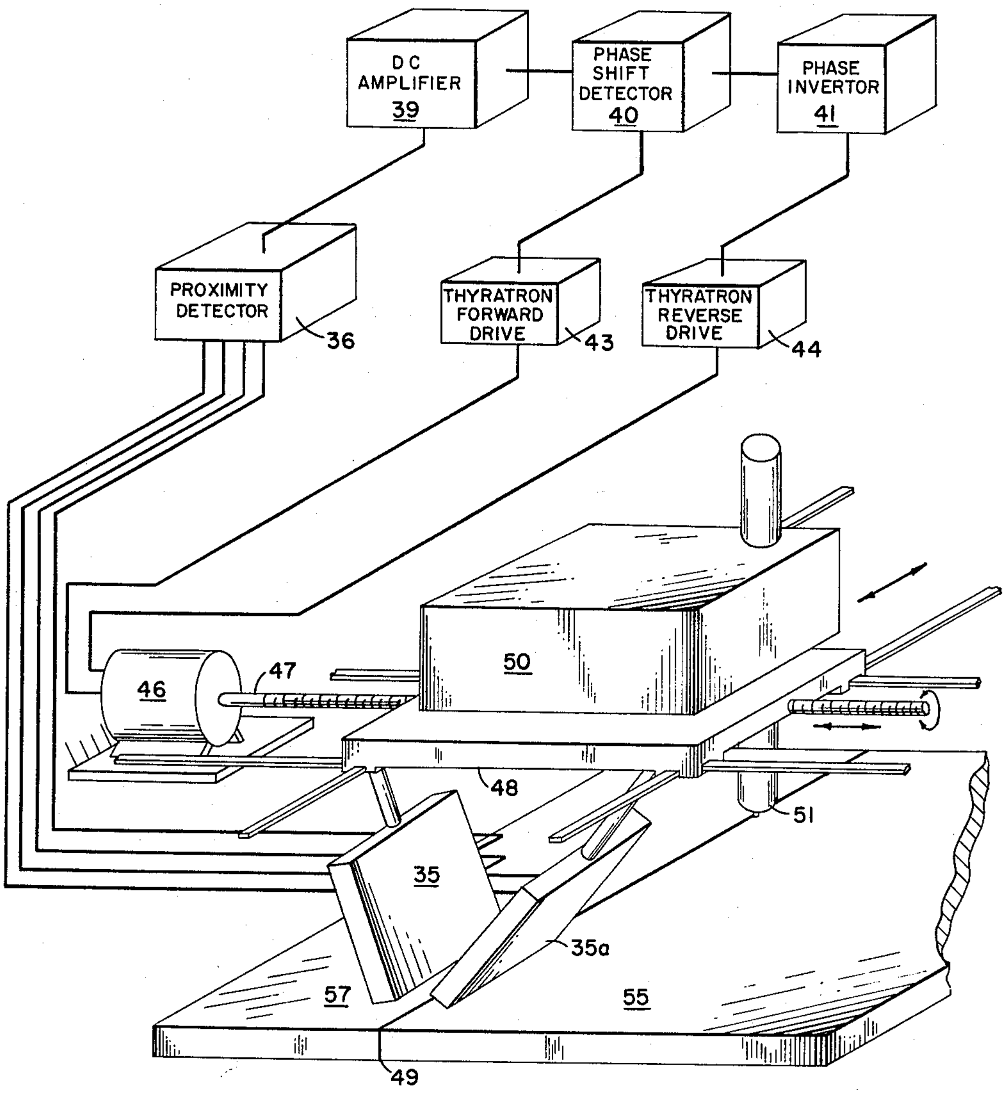
FIGURE 4 shows a combined circuit-pictorial diagram of a complete welding guide seam follower system.

FIGURE 4 shows the proximity detector illustrated in FIGURES 1–3 as a welding guidance control. Probes 35 and **35*a* sense the position of the seam to be welded, as indicated above, and together with the balance of oscillator circuitry provided by the proximity detector 36 (the circuit of FIGURE 1 less coils 16, 16*a*, 22 and 22*a*) provide a position error voltage. This is amplified by D.C. amplifier 39 and fed to phase shift detector or modulator 40** which converts the D.C. error voltage to an A.C. which follows in magnitude the D.C. error voltages and which shifts phase 180° if the polarity of the input signal shifts. A reference A.C. voltage is applied to phase shift detector 40 to provide the necessary A.C. carrier for conversion. The output of detector 40 is fed to phase inverter 41 which provides an output differing 180° in phase, the output of the detector 40 being applied to forward drive thyratron control circuit 43 and the phase inverter 41 output being applied to a reverse drive thyratron control circuit 44.

An A.C. input to thyratrons 43 and 44 provides the power which is controlled by thyratrons 43 and 44 to drive reversible D.C. motor 46 which through lateral screw 47 controls the horizontal position of table 48 over the seam 49 between the material 55 and 57 to be welded. Welding machine assembly 50 which is supported by table 48 thus holds welding torch 51 precisely over the seam. Thyratron drive controls 43 and 44 are conventional. An output of one of them is provided when the A.C. inputs (reference A.C. to anode circuit and inverter output to grid circuit) to that one are in phase. The reversible D.C. motor 46 is differentially coupled to controls 43 and 44 to cause rotation in one direction when the control potential is applied to the motor by control 43 and the other duration when applied by control 44.

Figure 5:
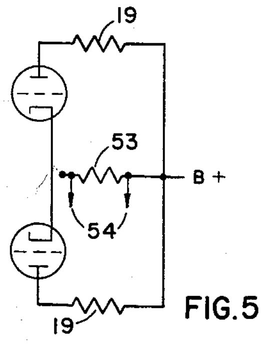
FIGURE 5 shows a modification of a portion of the circuit of FIGURE 1 which adapts the device for providing vertical control signals.

FIGURE 5 shows how an additional resistance, 53, may be added to the detector shown in FIGURE 1 to provide a signal take-off 54 which is responsive to the vertical displacement of the probes 35 and 35*a* from the work 55–57 since with vertical displacement the total oscillation of both units will either increase or decrease together. An additional vertical servo system similar to the horizontal system of FIGURE 4 may be used to control vertical heights, provided D.C. isolation of the detector from the first (lateral) servo system is maintained.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A seam follower comprising first and second oscillators, each said oscillator comprising amplifying means, a first resonant circuit connected to the input of said amplifying means, a second resonant circuit connected to the output of said amplifying means, a first coil forming an inductive element of said first resonant circuit and a second coil forming an inductive element of said second resonant circuit, said first and second coils being inductively coupled to each other, mounting means for said coils of said first and second oscillators, said second coils of said first and second oscillators being substantially identical and positioned by said mounting means with their electrical axes spaced, said second coils disposed adjacent a seam for sensing changes in permeability of the seam whereby the outputs of said oscillators vary with changes in the permeability sensed, means responsive to the outputs of said amplifying means of said first and second oscillators for positioning said mounting means to a position corresponding to equal output of said oscillators, each said second resonant circuit being tuned to near resonance of its associated first resonant circuit.

2. A seam follower, comprising first and second oscillators, each oscillator comprising amplifying means, a first resonant circuit connected to the input of said amplifying means, a second resonant circuit connected to the output of said amplifying means, a first coil forming an inductive element of said first resonant circuit and a second coil forming an inductive element of said second resonant circuit, said first and second coils being inductively coupled to each other, V shaped mounting means for said coils, said second coils of said first and second oscillators being substantially identical and positioned by said mounting means with their electrical axes forming, respectively, the legs of the V and being equally spaced from the vertex of the V, said second coils disposed adjacent a seam for sensing changes in permeability thereof whereby the outputs of said oscillators vary with changes in the permeability sensed, means responsive to the outputs of said amplifying means of said first and second oscillators for positioning said vertex of said V shaped mounting means to a position corresponding to equal outputs of said oscillators, each said second resonant circuit being tuned to near resonance of its associated first resonant circuit.

3. The seam follower set forth in claim 2 wherein said first coils are positioned with their axis corresponding to the axes of their associated said second coils and are positioned farther from said vertex than said second coils.

4. A proximity detector comprising a pair of amplifiers each having an input and output resonant circuit, said output resonant circuit being tuned to near resonance of said input resonant circuit of each of said amplifiers, each of said input and output resonant circuits including coils inductively coupled to each other to provide positive feedback and one of said coils disposed for magnetic engagement with a seam between a pair of metallic plates, output means connected between each of said output resonant circuits for producing an output responsive to the magnitude of said magnetic engagement of each of said coils with said seam.

5. A proximity detector as in claim 4 comprising a pair of probes each for housing said coils of said input and said output resonant circuits of a respective one of said amplifiers, said probes disposed for lateral displacement with respect to said seam.

6. A proximity detector as in claim 5 comprising circuit means connected to said output means for sensing said output and producing a signal responsive to the proximity of said probes to said seam.

7. A seam follower comprising a proximity detector including a pair of amplifiers each having an input and an output resonant circuit, said input and output circuits including coils inductively coupled to provide positive feedback; a pair of probes, the coils of a first of said amplifiers disposed in a first of said probes and the coils of a second of said amplifiers disposed in a second of said probes; said probes being disposed to place said output coils in magnetic engagement with a seam between two metallic plates and for lateral displacement with said seam; motor means connected to said probes for effecting said lateral displacement; and circuit means connected between said proximity detector and said motor means for sensing the magnitudes of said magnetic engagement and controlling said motor means responsive to said magnitudes.

8. A seam follower as set forth in claim 7 wherein the coils of said amplifiers are disposed in said probes with the output coils disposed relatively adjacent said seam and said input coils disposed relatively remote from said seam and adjacent said output coils.

References Cited by the Examiner

UNITED STATES PATENTS

| | | | |
|---|---|---|---|
| 2,192,978 | 3/40 | Macnabb | 331—167 |
| 2,642,530 | 6/53 | Mouzon | 331—167 |
| 2,787,710 | 4/57 | Von Tol | 331—138 |
| 2,835,858 | 5/58 | Moseley | 318—31 |
| 2,871,432 | 1/59 | Marzetta | 318—31 |
| 2,937,327 | 5/60 | Vossberg | 318—28 X |
| 2,971,079 | 2/61 | Sommeria. | |

FOREIGN PATENTS

| | | | |
|---|---|---|---|
| 349,496 | 5/31 | Great Britain. | |

JOHN F. COUCH, *Primary Examiner.*

MILTON O. HIRSHFIELD, ORIS L. RADER, *Examiners.*